(12) United States Patent
Buchwald

(10) Patent No.: US 12,475,468 B2
(45) Date of Patent: *Nov. 18, 2025

(54) ADMINISTRATIVE PRECOMPILES

(71) Applicant: Ava Labs, Inc., New York, NY (US)

(72) Inventor: Aaron Buchwald, New York, NY (US)

(73) Assignee: Ava Labs, Inc., New York, NY (US)

( * ) Notice: Subject to any disclaimer, the term of this patent is extended or adjusted under 35 U.S.C. 154(b) by 67 days.

This patent is subject to a terminal disclaimer.

(21) Appl. No.: 18/491,019

(22) Filed: Oct. 20, 2023

(65) Prior Publication Data

US 2024/0346507 A1    Oct. 17, 2024

Related U.S. Application Data

(60) Provisional application No. 63/495,735, filed on Apr. 12, 2023.

(51) Int. Cl.
*H04L 9/00* (2022.01)
*G06F 21/62* (2013.01)
*G06Q 10/0635* (2023.01)
*G06Q 20/02* (2012.01)
(Continued)

(52) U.S. Cl.
CPC ......... *G06Q 20/4016* (2013.01); *G06F 21/62* (2013.01); *G06Q 10/0635* (2013.01); *G06Q 20/02* (2013.01); *G06Q 20/4014* (2013.01); *H04L 9/00* (2013.01); *H04L 63/08* (2013.01)

(58) Field of Classification Search
CPC . G06Q 20/4016; G06Q 20/02; G06Q 20/4014
See application file for complete search history.

(56) References Cited

U.S. PATENT DOCUMENTS

| 9,935,772 | B1 | 4/2018 | Madisetti et al. |
| 10,803,186 | B2 * | 10/2020 | Considine ................ G06F 8/70 |
| 11,899,629 | B2 | 2/2024 | Reinsberg et al. |
| | | (Continued) | |

FOREIGN PATENT DOCUMENTS

| CA | 3208978 A1 * | 7/2022 | ........... G06Q 20/065 |
| CN | 111127207 A * | 5/2020 | ............ G06Q 40/04 |
| | (Continued) | | |

OTHER PUBLICATIONS

"Quantum-resistance in blockchain networks", Marcos Allende, Apr. 6, 2023, Scientific Reports, 13:5664 (Year: 2023).*

(Continued)

*Primary Examiner* — Duan Zhang
(74) *Attorney, Agent, or Firm* — McDermott Will & Schulte LLP

(57) ABSTRACT

A method and system for generating versions of assets comprising various levels of detail is provided. The method includes generating an institutional subnet with one or more blockchains. The method further includes enabling a set of administrative precompiles for the one or more blockchains, verifying whether a user of the institutional subnet is authorized to interact with the one or more blockchains. The method further includes generating a risk score associated with the user and modifying, based on the risk score, at least one administrative precompile in the set of administrative precompiles for the one or more blockchains based on risk score requirements of each of the blockchains.

20 Claims, 5 Drawing Sheets

(51) Int. Cl.
*G06Q 20/40* (2012.01)
*H04L 9/40* (2022.01)

(56) References Cited

U.S. PATENT DOCUMENTS

| | | |
|---|---|---|
| 2019/0081789 A1 | 3/2019 | Madisetti et al. |
| 2019/0180039 A1 | 6/2019 | Considine et al. |
| 2021/0272106 A1 | 9/2021 | Hayner et al. |
| 2021/0297425 A1 | 9/2021 | Ford |
| 2022/0230261 A1 | 7/2022 | Linden et al. |
| 2023/0385814 A1 | 11/2023 | Gauthier |
| 2024/0235860 A9 | 7/2024 | Zhu |

FOREIGN PATENT DOCUMENTS

| | | | |
|---|---|---|---|
| CN | 113259461 A | * 8/2021 | |
| CN | 110727948 B | * 10/2021 | ............... G06F 8/41 |

OTHER PUBLICATIONS

Blocmates. What is Avalanche?—A Complete Guide. Feb. 26, 2023, 14 pages. Retrieved on Feb. 20, 2025 from <https://web.archive.org/web/20240618180849/https://www.blocmates.com/articles/what-is-avalanche-a-complete-guide>.

DFINITY Foundation, What is a subnet? 2024, 2 pages. Retrieved on Feb. 11, 2025 from <https://web.archive.org/web/20240226045940/https://support.dfinity.org/hc/en-us/articles/360057132512-What-is-a-subnet>.

Jameson, C., Fireblocks launches support for Avalanche Spruce Subnet. Fireblocks, May 2, 2023, 7 pages. Retrieved on Feb. 21, 2025 from <https://www.fireblocks.com/blog/fireblocks-launches-support-for-avalanche-spruce-subnet>.

Merriam-Webster, Incorporated, subnetwork definition, 2025, 8 pages. Retrieved on Feb. 20, 2025 from <https://www.merriam-webster.com/dictionary/subnetwork>.

Sekniqi, K., et al., Avalanche Platform. Jun. 30, 2020, 14 pages.

Wright, G., et al., What is a subnet? TechTarget, last updated Jun. 2024, 10 pages. Retrieved on Feb. 20, 2025 from <https://www.techtarget.com/searchnetworking/definition/subnet>.

International Search Report and Written Opinion for International Patent App. No. PCT/US2024/024109, mailed Aug. 12, 2024 (10 pages).

* cited by examiner

ADMINISTRATIVE PRECOMPILES

The present disclosure is related and claims priority, under 35 U.S.C. § 119 (e), to U.S. Prov. Patent Application No. 63/495,735, entitled AUTHORIZING USERS IN INSTITUTIONAL SUBNETS, to Aaron Buchwald on Apr. 12, 2023, the contents of which are hereby incorporated by reference in their entirety, for all purposes.

TECHNICAL FIELD

Technical Field

This present disclosure generally relates to an institutional subnet included in a blockchain implementation. More specifically, determining if a counterparty is authorized to perform an operation within an institutional subnet using administrative precompiles that indicate whether a given address is authorized to do so.

Background

A blockchain is a database that maintains records for transactions and tracking of assets in blocks and/or tokens. Blocks may be native assets of the blockchain, whereas tokens may be assets created as part of a platform built on an existing blockchain. A blockchain network includes nodes such as a validator node that participates in consensus. Validator nodes are capable of verifying, voting on, staking and/or maintaining a record of transactions for the blockchain network as well as storing a copy of the blockchain. Validators are also responsible for producing and/or proposing blocks for addition to the blockchain network. Validators can participate in a consensus voting protocol for implementation of blockchain deployments or building on subnets. A subnet is a dynamic set of validators working together to achieve consensus on the state of a set of blockchains. Each blockchain is validated by exactly one subnet. A subnet can validate many blockchains. A node may be a member of many subnets. A subnet manages its own membership, and it may require that its constituent validators meet certain requirements. Institutions have varying requirements, and thus have difficulty interacting with decentralized applications.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
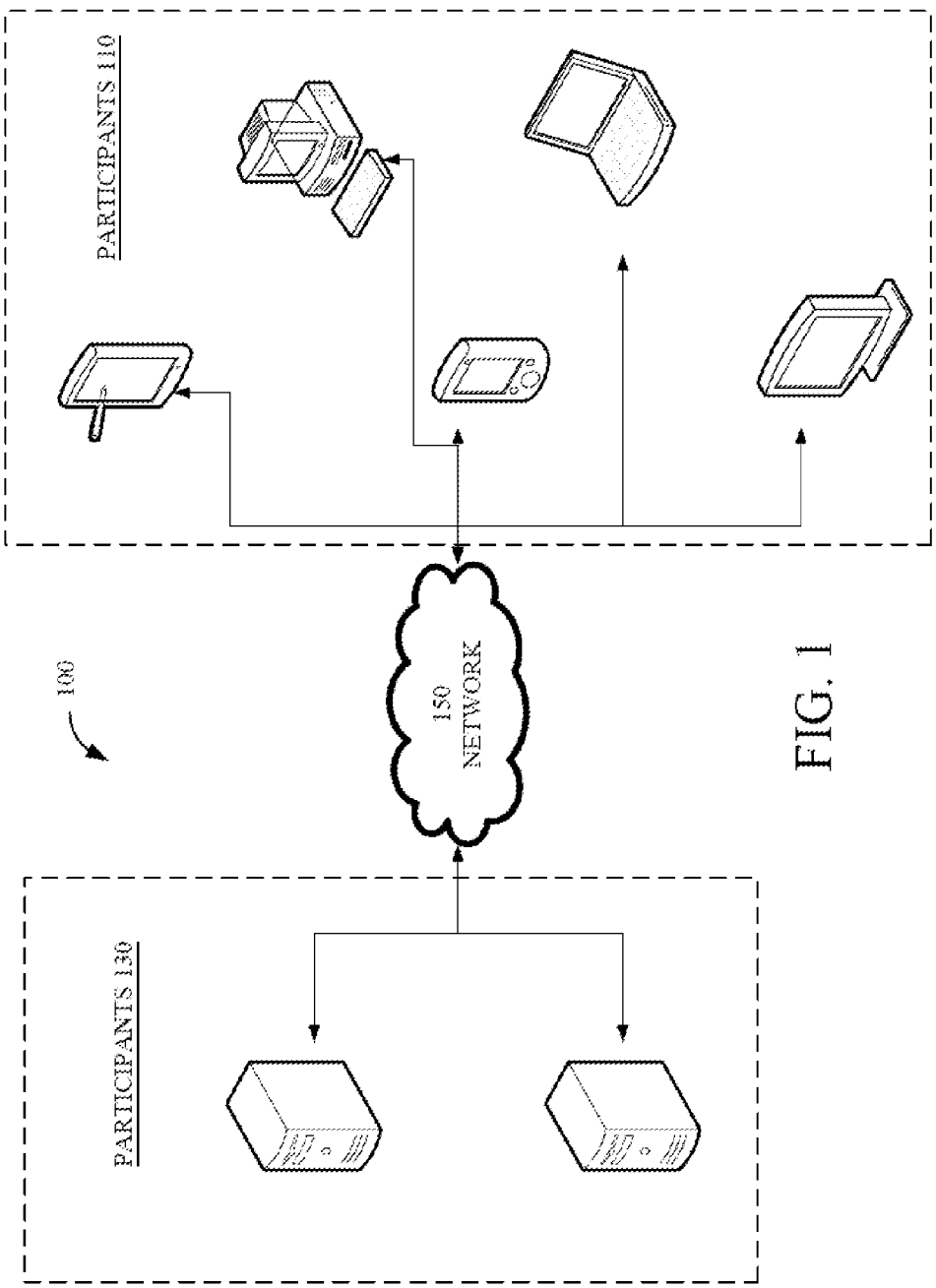
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

SUMMARY

The subject disclosure provides for systems and methods for implementing administrative precompiles in institutional subnets. In one aspect of the present disclosure, the method includes generating an institutional subnet with one or more blockchains, enabling a set of administrative precompiles for the one or more blockchains, verifying whether a user of the institutional subnet is authorized to interact with the one or more blockchains, generating a risk score associated with the user based on the verifying, and modifying, based on the risk score, at least one administrative precompile in the set of administrative precompiles for the one or more blockchains based on risk score requirements of each of the one or more blockchains.

Another aspect of the present disclosure relates to a system configured for implementing administrative precompiles in institutional subnets. The system includes one or more processors, and a memory storing instructions which, when executed by the one or more processors, cause the system to perform operations. The operations include generating an institutional subnet with one or more blockchains, enabling a set of administrative precompiles for the one or more blockchains, the set of administrative precompiles including parameters used to enforce security regulations in the institutional subnet, verifying whether a user of the institutional subnet is authorized to interact with the one or more blockchains, generating a risk score associated with the user based on the verifying, and modifying, based on the risk score, at least one administrative precompile in the set of administrative precompiles for the one or more blockchains based on risk score requirements of each of the one or more blockchains.

Yet another aspect of the present disclosure relates to a non-transient computer-readable storage medium having instructions embodied thereon, the instructions being executable by one or more processors to perform one or more of the methods according to one or more embodiments described herein. For example, a method including generating an institutional subnet with one or more blockchains, enabling a set of administrative precompiles for the one or more blockchains, the set of administrative precompiles including parameters used to enforce security regulations in the institutional subnet, verifying whether a user of the institutional subnet is authorized to interact with the one or more blockchains, generating a risk score associated with the user based on the verifying, and modifying, based on the risk score, at least one administrative precompile in the set of administrative precompiles for the one or more blockchains based on risk score requirements of each of the one or more blockchains.

These and other embodiments will be evident from the present disclosure. It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Blockchain platforms, such as for smart contracts, may require a consensus protocol as a fundamental building block for building distributed systems. As an example, a blockchain platform can include multiple blockchains, such as a component exchange blockchain for creating and trading digital smart assets, a metadata blockchain for coordinating validators as well as tracking and creating subnets, and a contract blockchain for creating smart contracts. As used herein, a subnet or subnetwork comprises a dynamic set of validators seeking to achieve consensus on a state of a set of blockchains such that one blockchain is validated by one subnet although one subnet can validate multiple blockchains. Also, a validator node can be a member of multiple subnets and can be subject to requirements such as for security, licensing, hardware and/or the like. As a non-limiting example, subnets may require validators abide by Know Your Customer/Know your Business/Anti-money Laundering (KYC/KYB/AML) obligations. Blockchains being validated by validators may be blockchain networks with application-level logic defined by multiple virtual machines (VMs) which enable more decentralized networks. In particular, a blockchain may be an instance of a VM that specifies the blockchain's state, state transition function, transactions, and application programming interface (API) for user interaction.

The VM may deploy smart contracts' bytecode. Implementing instructions on the VM for certain operations can be costly. Precompiles are designed to execute a function implemented by the VM, rather than an actual contract, thus saving cost on the system. By non-limiting example, precompiles may be used to perform cryptographic operations, add functions, remove a function, etc. A precompile is associated with a fixed address defined in the VM. There is no bytecode associated with the fixed address. When a precompile is called (e.g., performing a call operation calling a specific address), the VM checks if the input address is a precompile address. A plurality of addresses that include a precompile may be hard coded in the VM. If the call operation is to a precompile address, the VM executes the precompile and performs some operation. Otherwise (i.e., if the call operation is not to a precompile address), the smart contract is loaded at the input address and executed on a VM interpreter with the specified input data. Precompiles may be limiting in some aspects. For example, the precompiles are not permitted state access to the VM making it challenging for users to build their own precompiles, add new functionality to the system, and/or update subnet configurations from their initially defined state.

The subject disclosure overcomes the above-described shortcomings by providing systems and methods for performing operations in the VM using administrative precompiles in institutional subnets. According to embodiments, a set of administrative precompiles may be provided in a platform layer (i.e., Platform Chain (P-Chain)) of a blockchain to perform various operations and/or implement functionalities. The administrative precompiles allow network operators (e.g., administrative controllers) to dictate how users interact with the VM.

According to embodiments, administrative precompiles include state access, and as such may be used to modify aspects of the blockchain's state machine by issuing transactions to the network. As such, the blockchain is not required to coordinate a network upgrade based on counterparties or varying KYC/AML obligations. Aspects of the blockchain's state machine can be modified via designated administrative addresses, which can be controlled by an Externally Owned Account (EOA), Multi-Party Computation (MPC) blockchain wallet, smart contract wallet, Decentralized Autonomous Organization (DAO), or other governance smart contract. The changes to the state machine itself can be used to modify parameters of the network. By way of non-limiting example, parameters of the network may include, but are not limited to, addresses allowed to submit transactions to the network, addresses allowed to deploy contracts to the network, addresses allowed to mint native tokens of the network, fee parameterization of the network, protocol parameters specifying gas fees, and other parameters of the network. This can be used to significantly reduce the operational burden of the network and to add novel features at the protocol level (such as, transaction allow lists and contract deployer allow lists).

According to embodiments, administrative precompiles, beyond executing operations, are allowed to write to the VM. For example, an administrative precompile may be configured to store a function (or data) in a permanent state on the VM. In this manner, the stored function may be continuously called and build on itself or other preexisting functions of the VM to, for example, add new functionalities.

According to embodiments, administrative precompiles may be used to generate a subnet where only specific addresses are allowed to interact with the blockchain. The subnet may be generated by submitting transactions or deploying contracts based on a contract that is updated to register KYC addresses and update corresponding risk scores to determine which counterparties should be allowed to interact with the blockchain. This significantly reduces the operational burden for administrators and allows for increased adaptability to operational capabilities of the blockchain. Embodiments may be implemented to provide KYC/AML credentials for cryptographic abstractions that protect the identity of the transaction originator. For example, a commitment to a set of addresses may be authenticated by the KYC provider instead of an individual address, which allows the user more flexibility over how assets can be moved (e.g., across chains of a blockchain network).

The disclosed system addresses a problem in traditional blockchains tied to computer technology, namely, the technical problem of providing scalability and extensibility to a blockchain. The disclosed system solves this technical problem by providing a solution also rooted in computer technology, namely, by providing administrative precompiles which enable administrative control over blockchain infrastructures and buildable functionalities in the blockchain.

The disclosed system also improves the functioning of the computer itself because it reduces the cost of system resources and improves data processing.

Groups/institutions have varying KYC/KYB/AML obligations (hereafter also referred to merely as "obligations"). Therefore, it is difficult for them to interact with decentralized applications (such as, but not limited to, decentralized finance (DeFi) primitives). Thus, there is a need to enable institutional access to decentralized networks and blockchain applications. DeFi primitives allow an individual to perform financial transactions without a direct counterparty. For example, when placing an order on a decentralized exchange, users trade against a decentralized and anonymous pool of users that have provided liquidity to the pool. This presents a challenge for institutions that need to comply with KYC/AML obligations with differing counterparts. Because there may be a large number of anonymous counterparties, which does not allow them to meet their KYC/AML obligations, it may be advantageous and a technological improvement for blockchain platforms to include a third-party application that provides a non-transferable token (NTT), e.g., from an NTT provider, which attests to the KYC/AML status of a given address associated with a counterparty. Individual applications are then required to query the NTT in order to check whether an address should be allowed to interact with their application, which beneficially reduces load on the validators and making the blockchain platforms more gas efficient by placing the burden on the application developer to query the third-party NTT before allowing interactions.

The disclosed system addresses a problem in traditional blockchains tied to computer technology, namely, the technical problem of institutional compliance in blockchain technology. The disclosed system solves this technical problem by providing a solution also rooted in computer technology, namely, by providing systems, methods, and machine-readable media for enforcing regulatory compliance for interactions through the use of the admin precompiles comprising admin like parameters. The disclosed system also improves the functioning of the computer itself because it reduces the cost of system resources and improves data processing.

As used herein, the term "blockchain" generally refers to an open and distributed public ledger comprising a growing list of records, which are linked using cryptography. By design, the blockchain is resistant to modification of the data. The blockchain can include an auditable database that provides a distributed, replicated ledger of cryptographically certified artifacts whose contents are extremely difficult to tamper with without detection, and therefore, are with very high probability, true copies of the intended content, and whose content are open for inspection via a suitable query interface.

As used herein, the term "block" generally refers to a record that is kept in a blockchain. For example, each block contains a cryptographic hash of the previous block, a timestamp, and transaction data, which can generally be represented as a Merkle tree root hash.

As used herein, the term "tokens" may be created as part of a platform that is built on an existing blockchain. Tokens of a blockchain may be transferred across chains in a blockchain network. Addresses may be generated for each transaction when sending (or receiving) transactions through the network (e.g., in a blockchain wallet). NTTs are non-transferable tokens that serve as identity symbols in a decentralized network. As such, tokens (e.g., non-fungible tokens (NFTs)) can be transferred but NTTs cannot be transferred. NTTs may be bound to the blockchain or blockchain network.

As used herein, the term "subnet" or "subnetwork" generally refers to a dynamic set of validators working together to achieve consensus on a state of a set of blockchains. For example, each blockchain is validated by exactly one subnet. A subnet can validate arbitrarily many blockchains. A validator node may be a member of arbitrarily many subnets. A subnet may manage its own membership and it may require that its constituent validators have certain properties.

As used herein, the term "primary network" generally refers to a special subnet, which validates built-in blockchains. Members of the subnets may also be a member of the primary network. In some embodiments, a subject that is member of the primary network, stakes (e.g., acquires or "buys") one or more tokens from the primary network. As a result, blockchain validators can validate built-in blockchains on the primary network and have also staked primary network tokens.

Example System Architecture

FIG. 1 is a block diagram of a device operating environment with which aspects of the present disclosure can be implemented. FIG. 1 illustrates an exemplary network architecture 100 to provide a blockchain platform (e.g., blockchain network implementation/deployment platform) for managing the proposal of blocks to be added to a blockchain, according to some embodiments. The blockchain may be a linear chain of blocks of the same dimension, such as the same height, size, length, etc. Blocks of the blockchain may comprise or store data or organized information (e.g., records of information), including a cryptographic hash of the previous block, a timestamp, and transaction data, for example. The network architecture 100 of FIG. 1 includes one or more participants 110 and one or more participants 130 which are communicatively coupled through the network 150. The blockchain architecture of the network architecture 100 can be a distributed database that maintains a continuously growing list of ordered records as the blocks. The blockchain architecture may implement methods and systems according to one or more embodiments. It is understood that the participants 130 may include the participants 110 as well, such that they are peers.

For example, the participants 110/130 may be clients of the blockchain platform for creating, expanding, or otherwise modifying customized blockchain networks and/or private or public subnets. As an example, the participants 110 may be different computers linked by the network 150 in a blockchain network having a same database. As an example, the participants 110 can function as validators or proposers to propose or add blocks to an existing blockchain. As an example, the participants 110 may be virtual machines (VMs) that form nodes of the blockchain network architecture 100. The participants 110 that function as nodes can run software to verify block and transaction data, store data, validate, respond to network requests for data, and/or the like for the existing blockchain. VMs can be computers that run on blockchain and allow smart contracts from multiple sources to interact with one another. The participants 110 can generate blocks upon request by the participants 130, such as via a consensus engine or module of the participants 130 at a particular time such as during a specified temporal submission window. The blocks being generated and proposed for addition to the existing blockchain may be validated as being a valid block before its addition.

The network 150 may include a wired network (e.g., via fiber optic or copper wire, telephone lines, and the like) or wireless network (e.g., a cellular network, radio-frequency (RF) network, Wi-Fi, Bluetooth, and the like). The participants 110 may be any one of a mobile device, a laptop, a desktop, a tablet (e.g., palm or pad) device, a television, a display device, and/or the like. The participants 110 can be controlled by users as a set of validator nodes for making decisions in tandem, such as for facilitating operation or design of the blockchain implementations of the blockchain platform.

As discussed herein, the blockchain network architecture 100 can incorporate application of a consensus protocol that is high throughput, totally-ordered, and effective for smart contracts. Smart contracts may refer to self-executing computer programs, applications, or contracts for executing transactions such as financial transactions involving cryptocurrency. The blockchain network architecture 100 may be used for creation of custom blockchains (including private blockchains) and decentralized applications (dApps). The consensus protocol may be for agreement on the validity of user transactions, adding blocks to the existing blockchain, interaction with external resources (e.g., off-chain), etc. The consensus protocol implemented by the blockchain network architecture 100 may be a decentralized, leaderless block proposal mechanism that handles multiple valid block proposals concurrently and limits the submission of proposals for the existing blockchain. As an example, the blockchain network architecture 100 may use repeated subsample voting and validators may provide strong probabilistic guarantees of correctness (e.g., safety and liveness) without communicating with other validators.

Furthermore, the blockchain network architecture 100 may improve block proposal by reducing the processing load/cost associated with handling multiple block proposals concurrently and being required to select a proposal of the concurrent multiple proposals. Multiple participants 110 may have access to the blockchain platform hosted by the participants 130 via an online or offline connection, such as a wireless connection, wired connection, ad hoc connection, mobile connection, satellite connection, and/or the like. Each of the participants 130 may be a computing device such as part of a cloud computing server including one or more desktop computers or panels mounted on racks, and/or the like. The panels may include processing boards and also switchboards, routers, and other network devices. The blockchain network architecture 100 will allow participants 110/130 to seamlessly transfer assets between chains.

The participants 130 may store data of the existing blockchain in a peer-to-peer (P2P) and/or distributed ledger fashion. In particular, the participants 130 may function in conjunction to autonomously manage the decentralized database(s) of the existing blockchain via the P2P network and a distributed timestamping server of the participants 130. The participants 130 may be configured to implement multiple chains of the blockchain network architecture 100. For example, the participants 130 can implement a plurality of chains of the blockchain network architecture 100, such as an asset blockchain (e.g., for creating of new assets, asset exchange, cross-subnet transfers), metadata blockchain (e.g., for coordinating validators, tracking active subnets, and creating new subnets), smart contract blockchain (e.g., for creating smart contracts and applications that require total ordering), etc. The plurality of chains can be validated by a primary network of the blockchain network architecture 100 that comprises all existing subnets.

The blockchain network architecture 100 may comprise of three built-in blockchain layers: Exchange Chain (X-Chain), Platform Chain (P-Chain), and Contract Chain (C-Chain). All three blockchain layers may be validated and secured by the primary network of the blockchain network architecture 100.

A participant 110 and a server of one or more participants 130 of a computing network may access each other and other devices in the network 150 via corresponding communications modules. The communications modules may each include radio hardware and software such as RF antennas, analog circuitry, digital to analog conversion circuits, digital signal processing circuitry, and/or the like. Generally, the participant 110 and the participant 130 comprise computing devices including at least: a memory storing instructions and processors configured to execute the instructions to perform, at least partially, one or more steps as described in methods disclosed herein. For example, the memory 220a of the participant 110 may be used to perform functions associated with the blockchain platform hosted by the participant 130. The processors may be used to operate the participant 110, such as to execute applications and functions thereof rendered on the participant 110. The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 2:
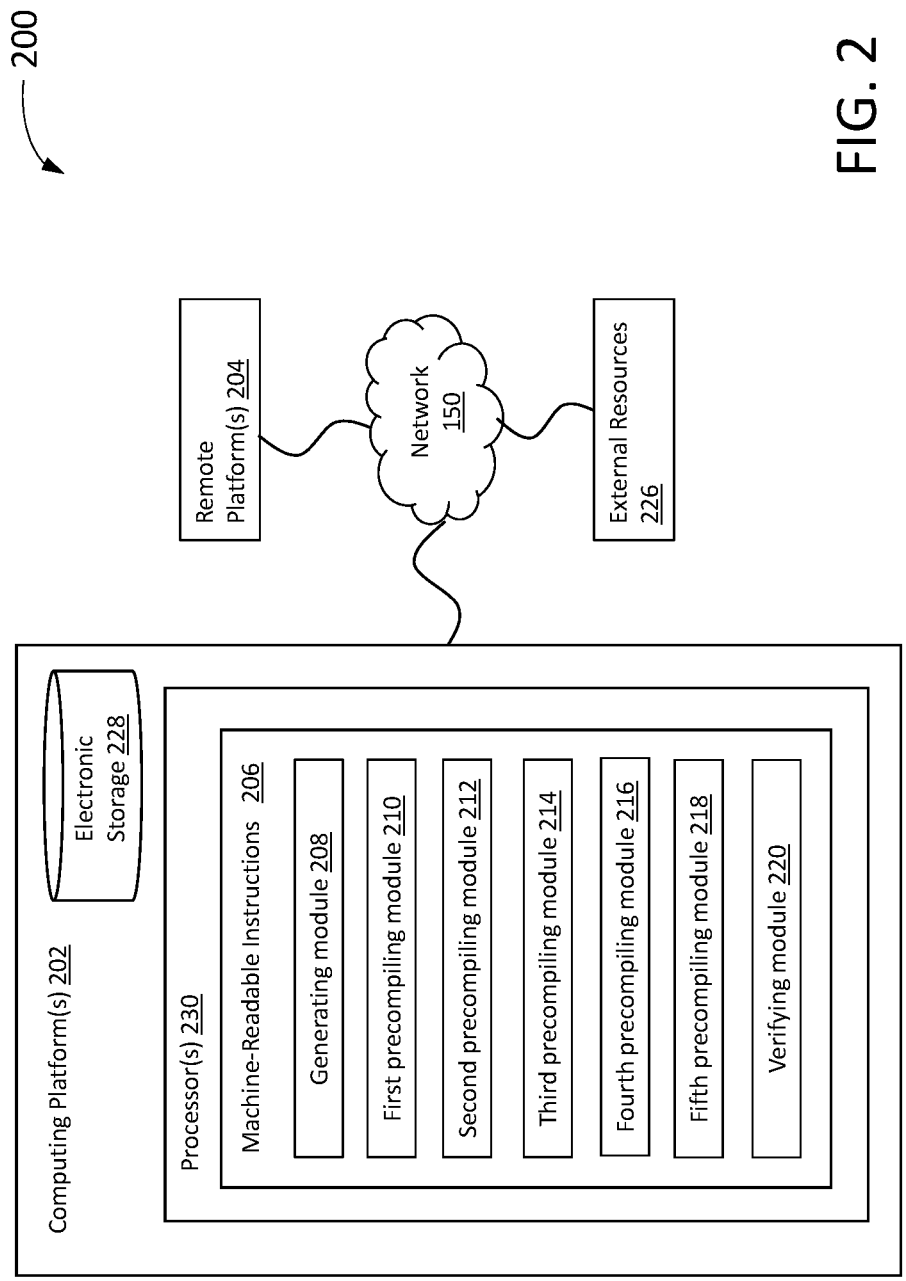
FIG. 2 illustrates a system implementing administrative precompiles in institutional subnets, in accordance with one or more implementations.

FIG. 2 illustrates a system 200 configured for implementing administrative precompiles in institutional subnets, in accordance with one or more implementations. In some implementations, system 200 may include one or more computing platforms 202. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by machine-readable instructions 206. Machine-readable instructions 206 may include one or more instruction modules 208. The instruction modules may include computer program modules. The instruction modules include one or more of generating module 208, first precompile module 210, second precompile module 212, third precompile module 214, fourth precompile module 216, fifth precompile module 218, and/or verifying module 220.

According to embodiments, administrators (also referred to as "admin controllers") can perform operations in a VM using administrative precompiles or "admin precompiles." The admin precompiles are used to inject new functions or otherwise modify a VM. The admin precompiles provide plug and play functionality for admin controllers over user interactions in the VM. According to embodiments, the admin precompiles are provided by the system 200 to a user space (e.g., a user portal or the like).

The generating module 208 can be configured to generate a platform blockchain. The generating module 208 may also be configured to launch at least one institutional subnet based in part on the platform blockchain. For example, the subnet may include one or more blockchains (N blockchains) with a VM. The VM may include a set of admin precompiles enabled therein which may be used to modify different aspects of the VM and gain access to various individual functionalities. In aspects of embodiments, the admin precompiles include, but are not limited by, a transaction allow precompile, a contract deployer precompile, a native minter precompile, a fee configuration precompile, and a reward manager precompile.

In some embodiments, the set of admin precompiles may be updated via, e.g., a network upgrade after the subnet has already been generated. The upgrade may be implemented in a specified block timestamp. In some implementations, the system may activate a new admin precompile based on an initial configuration. For example, after the subnet is launched, transaction levels may not be enabled at a first timestamp. Thus, a new precompile may be activated from the first timestamp onward based on a starting state.

Each admin precompile in the set of admin precompiles contains a list of addresses. The addresses in the list of addresses may include, but are not limited to, contract addresses, externally owned account (EOA) addresses controlled by public/private key pairs, etc. The list of addresses may be comprised of admin operators, admin users, and/or authorized addresses. Each admin operator may correspond to one or more addresses in the list of addresses. In some implementations, the blockchain can only be modified by the admin operators. The system may have write access to a list of addresses during execution of the admin precompiles. As such, an admin operator may modify the list of addresses (e.g., add an address to the list of authorized addresses) at any time. The list of addresses can also be read at any point in the code base of the platform blockchain. In some implementations, authorized addresses in the list of addresses can perform a call operation to the admin precompile and add new addresses to the list of addresses authorized to perform operations or implement functionalities based on the admin precompile (e.g., issue a transaction, deploy a contract, etc.). Similarly, authorized addresses in the list of addresses can perform a call operation to remove an existing address from the list of addresses. Each admin precompile may be associated with a unique list of addresses. In some implementations, one or more of the addresses included in one or more address lists associated with each of the admin precompiles are the same.

The first precompile module 210 may enable operations of the transaction allow precompile which maintains a list of addresses that are allowed to modify aspects of the blockchain. If enabled, the transaction allow precompile allows transactions in the blockchain based on the list of addresses. For example, addresses on the list of addresses may submit transactions to the blockchain.

The second precompile module 212 may enable operations of the contract deployer precompile which maintains a list of addresses that are allowed to deploy a contract on the blockchain. If enabled, the contract deployer precompile allows contract deployments in the blockchain based on the list of addresses.

The third precompile module 214 may enable operations of the native minter precompile which maintains a list of addresses that are allowed to mint an arbitrary amount of the native token of the subnet. The native minter precompile provides users with an easy way to mint new funds when, for example, the system has expended all the funds. The native minter precompile also allows for fund creation while maintaining greater granular control of the rules and policies associated with each token of the blockchain as well as the subnet setup.

The fourth precompile module 216 may enable operations of the fee configuration precompile which maintains a list of addresses that are allowed to perform a call that arbitrarily updates the fee configuration of the subnet. The fee configuration precompile acts as a fee configuration manager within the VM. Fees are generally associated with processing each transaction in the blockchain. The fee may be determined based on a dynamic fee algorithm using various parameters. The fee configuration precompile provides support for admin controllers to update fee configurations of a subnet at any point in time. For example, if an initial fee configuration becomes suboptimal overtime, the admin controller may update the fee configuration on the fly via the fee configuration precompile. In some implementations, any of the admin operators associated with the list of addresses may be authorized to update the fee configuration via the fee configuration precompile.

The fifth precompile module 218 may enable operations of the reward manager precompile which maintains a list of addresses that are allowed to update an award manager in the VM and update how rewards are distributed in the platform blockchain or blockchain network. Rewards are sent to a designated address that may be set by, for example, a block producer. In some implementations, the block producer does not have control over the designated address. As such, all fees are burnt or sent to a dead address. In some implementations, rewards are required to be sent to a specific address that will have control over all of the funds in the platform blockchain or blockchain network. In some implementations, rewards are sent to a smart contract which is configured to distribute funds throughout the platform blockchain or blockchain network. Embodiments are not limited in scope to these implementations and may include other implementations considered within scope by one of ordinary skill in the art.

Embodiments may include a plurality of admin precompiles, and similarly precompile modules, implemented at the system level and enabled in a virtual machine (e.g., in Proof-of-Stake (POS) blockchains and/or Proof-of-Authority (PoA) blockchains, etc.).

The verifying module 220 can be configured to verify an address based on the admin precompiles of one or more of the precompile modules 210, 212, 214, 216, and/or 218. For example, the verifying module 220 can determine if a list of addresses associated with one or more of the admin precompiles are activated, and further determine if a requesting address is allowed to perform an operation (e.g., issue a transaction, deploy a contract, manage reward distribution, etc.) in the blockchain. That is, the verifying module 220 determines whether a requesting address is an allowed address in the list of addresses as defined by the set of admin precompiles. If the requesting address is an allowed address, then the operation is submitted. If not, the operation is immediately rejected and will not be valid for execution within the VM.

In some implementations, computing platform(s) 202, remote platform(s) 204, and/or external resources 226 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 226 may be operatively linked via some other communication media.

A given remote platform 204 may include one or more processors configured to execute computer program modules. The computer program modules may be configured to enable an expert or user associated with the given remote platform 204 to interface with system 200 and/or external resources 226, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

External resources 226 may include sources of information outside of system 200, external entities participating with system 200, and/or other resources. In some implementations, some or all of the functionality attributed herein to external resources 226 may be provided by resources included in system 200.

Computing platform(s) 202 may include electronic storage 228, one or more processors 230, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 228 may comprise non-transitory storage media that electronically stores information. The electronic storage media of electronic storage 228 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 228 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 228 may include one or more virtual storage resources (e.g., cloud storage, a virtual private network, and/or other virtual storage resources). Electronic storage 228 may store software algorithms, information determined by processor(s) 230, information received from computing platform(s) 202, information received from remote platform(s) 204, and/or other information that enables computing platform(s) 202 to function as described herein.

Processor(s) 230 may be configured to provide information processing capabilities in computing platform(s) 202. As such, processor(s) 230 may include one or more of a digital processor, an analog processor, a digital circuit designed to process information, an analog circuit designed to process information, a state machine, and/or other mechanisms for electronically processing information. Although processor(s) 230 is shown in FIG. 2 as a single entity, this is for illustrative purposes only. In some implementations, processor(s) 230 may include a plurality of processing units. These processing units may be physically located within the same device, or processor(s) 230 may represent processing functionality of a plurality of devices operating in coordination. Processor(s) 230 may be configured to execute one or more modules (configured to perform one or more steps/operations as described herein). Processor(s) 230 may be configured to execute modules by software; hardware; firmware; some combination of software, hardware, and/or firmware; and/or other mechanisms for configuring processing capabilities on processor(s) 230. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, 214, 216, 218, and/or 220 are illustrated as being implemented within a single processing unit, one or more of modules may be implemented by multiple processing units. In some implementations, one or more of modules may be implemented remotely from the other modules. The description of the functionality provided by the different modules 208, 210, 212, 214, 216, 218, and/or 220 described below is for illustrative purposes, and is not intended to be limiting, as any of modules 208, 210, 212, 214, 216, 218, and/or 220 can provide more or less functionality than is described. For example, one or more of modules 208, 210, 212, 214, 216, 218, and/or 220 can be eliminated, and some or all of its functionality can be provided by other ones of modules 208, 210, 212, 214, 216, 218, and/or 220. As another example, processor(s) 230 can be configured to execute one or more additional modules that can perform some or all the functionality attributed below to one of modules 208, 210, 212, 214, 216, 218, and/or 220.

The techniques described herein can be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
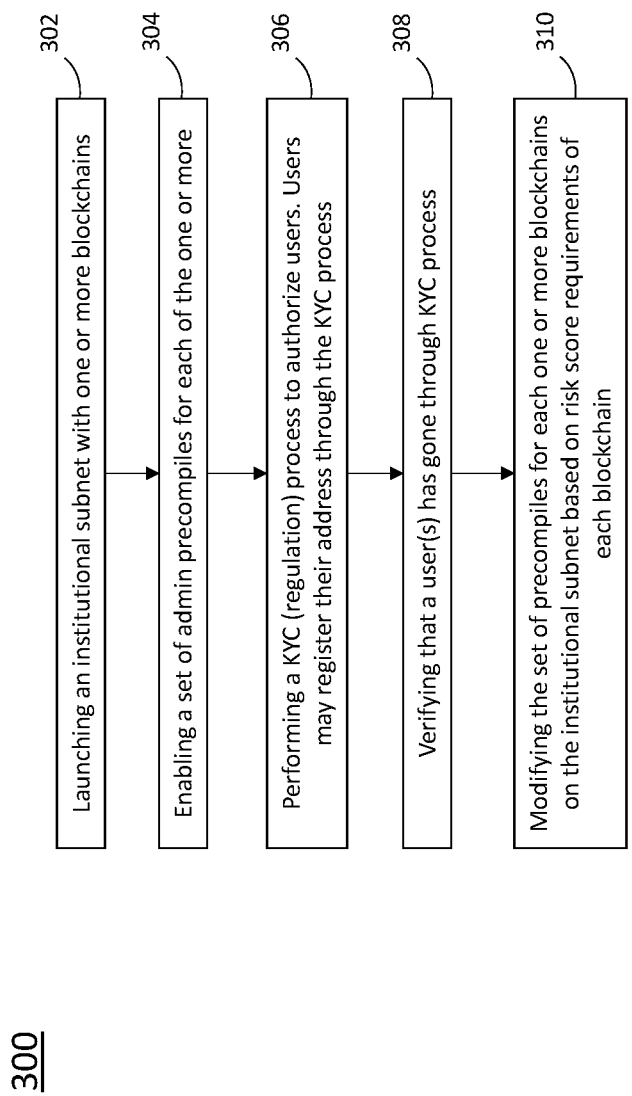
FIG. 3 is an exemplary flowchart illustrating blocks in a method for implementing admin precompiles in institutional subnets, in accordance with one or more implementations.

FIG. 3 is an example flowchart illustrating blocks in a method 300 of implementing admin precompiles in institutional subnets, according to some embodiments.

The example method 300 as described herein may be performed by one or more modules of system 200. For example, at least one or more steps in method 300 may be performed by a computer platform including an electronic storage and one or more processors executing machine-readable instructions and communicatively coupled with a remote platform and external resources via a network (cf. computing platform 202, processors 230, machine-readable instructions 206, remote platform 204, external resources 226, and network 150). In addition, the machine-readable instructions may be part of a generating module, admin precompile module(s), and a verifying module, as disclosed herein (cf. generating module 208, first precompile module 210, second precompile module 212, third precompile module 214, fourth precompile module 216, fifth precompile module 218, and/or verifying module 220). For explanatory purposes, the steps of the example method 300 are described herein as occurring in serial, or linearly. However, multiple instances of the example method 300 may occur in parallel. Moreover, in embodiments consistent with the present disclosure, at least one or more steps in method 300 may be executed in a different order, simultaneously, quasi-simultaneously, or overlapping in time.

At step 302, the method 300 may include launching an institutional subnet with one or more blockchains. The one or more blockchains may have VMs that enable admin precompiles. The admin precompiles may include one or more arbitrary parameters of the state machine. In some implementations, the admin precompiles may include admin like parameters used to enforce KYC/KYB compliance for interactions that take place on the blockchain.

At step 304, the method 300 may include enabling a set of admin precompiles for each of the one or more blockchains. The set of admin precompiles may include a transaction allow precompile, a contract deployer precompile, a native minter precompile, a fee configuration precompile, and a reward manager precompile. The precompiles included in the set of admin precompiles may only be modified by a set of administrative addresses.

At step 306, the method 300 may include performing a KYC (regulation) process to authorize users. In some embodiments, the method may include registering authorized users and permitting registered users to interact with the one or more blockchains.

Users may register their address through the KYC process. Embodiments are not limited to KYC and may include, but are not limited to, KYB and/or AML compliance regulation processes. All interactions with the one or more blockchains are required to complete a KYC (regulation) process. The admin like parameter may indicate (e.g., as a flag or status indicator) whether a user has gone through the KYC process. Therefore, based on a value of the admin like parameter, an address may be allowed to interact with the blockchain. In this manner, in order for an address to be listed in one or more of the precompiles in the set of admin precompiles, the address must have already been identified as a complying address via the KYC process. As such, users attempting to deploy applications or interact with a blockchain can be viewed as trusted/authorized users.

For example, in order to get on the list of addresses included in the transaction allow precompile to be allowed to issue transactions, the user must have gone through the KYC process. As another non-limiting example, in order to deploy a contract, the user must have gone through a KYB process.

At step 308, the method 300 may include verifying that a user(s) has gone through the KYC process. Based on a user being verified as having completed the KYC process, the user is permitted to interact with the blockchains of the institutional subnet. In some implementations, the method 300 further includes generating and tracking a risk score (e.g., AML risk score) for each of the (one or more) users based on the verification (i.e., KYC process).

In some implementations, an NTT application may be deployed on one more of the one or more blockchains or a third-party blockchain to administrate the admin precompiles. In some embodiments, the NTT application may be deployed on the C-Chain of a blockchain. In some embodiments, the NTT application is deployed on the primary network's blockchain to maximize visibility of the NTT application. According to some embodiments, the method 300 may even further include creating, at the NTT application, a portal for users to go through the KYC process. In some implementations, the NTT provider is an admin of the precompiles. The NTT provider of the NTT application provides regular risk checks to update a risk score associated with the users.

According to embodiments, although institutions are not aware of who their counterparty is, the institutions will know that their counterparty has met their KYC obligations through, e.g., a third-party NTT. An institution can determine what counterparties they have interacted with via the NTT provider. A record of all transactions of a blockchain may be kept on-chain. Therefore, even if the institutions cannot identify counterparties, the counterparties can be tracked via the record at the request of regulators.

In some implementations, an address associated with a counterparty can only involve a function if it has a NTT that indicated that the counterparty has been through an authorization process and been authorized to perform a transaction. Within a subnet (or institutional subnet), governance determines who issued/revoked a NTT. VMs may require registration of an address before the VM can send (or receive) funds or transactions. This prevents fund loss. According to embodiments, the authorization process may comprise of checking a subnet to determine if a user (or counterparty) is authorized to perform a transaction. In some implementations, the authorization process may start with a trusted central KYC provider and then move towards a DAO based approach to perform the authorization process.

At step 310, the method 300 may include modifying the set of precompiles for one or more blockchains on the institutional subnet based on risk score requirements of each blockchain. Modifying the set of precompiles may include adding an address to an authorized list of addresses associated with one or more of the admin precompiles. The risk score requirements may be a KYC/AML risk score indicating what is required of users to interact with the blockchain, a threshold or range of the KYC/AML risk score, or the like.

In some implementations, the set of precompiles may be modified by adding (and similarly, removing) one or more admin precompiles to the set of admin precompiles.

According to some embodiments, the method 300 may further include creating a set of blockchains each following the KYC/AML risk score requirements. According to an aspect, the method 300 may include defining a set of rules outlining conditions for transferring funds. That is, the set of rules define under what conditions funds are allowed to be moved between blockchains. The institutional subnet may define its own set of rules.

Although FIG. 3 shows example blocks of the method 300, in some implementations, the method 300 may include additional blocks, fewer blocks, different blocks, or differently arranged blocks than those depicted in FIG. 3. In some embodiments, methods consistent with the present disclosure may include at least one or more operations as in method 300 performed in a different order, simultaneously, quasi-simultaneously or overlapping in time. Additionally, or alternatively, two or more of the blocks of the method may be performed in parallel.

Figure 4:
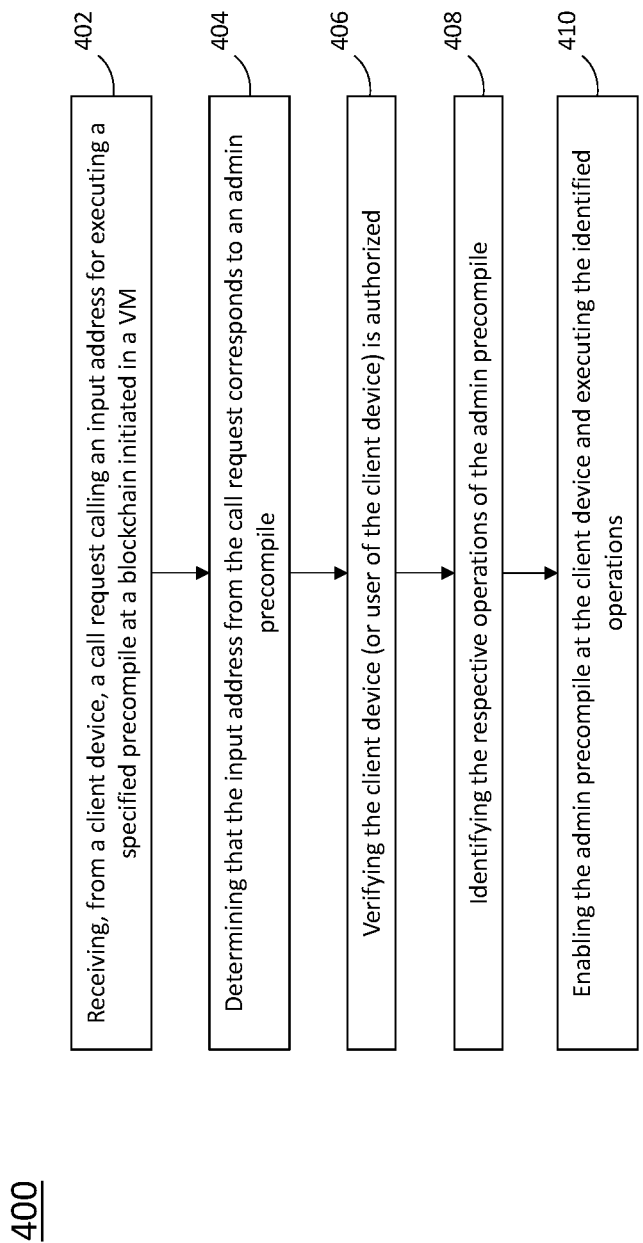
FIG. 4 is an exemplary flow diagram illustrating a process for enabling administrative precompiles in blockchains, in accordance with one or more implementations.

FIG. 4 illustrates an example flow diagram of a process 400 for enabling admin precompiles in blockchains, according to certain aspects of the disclosure. For example, at least one or more steps in process 400 may be performed by a computer platform including an electronic storage and one or more processors executing machine-readable instructions and communicatively coupled with a remote platform and external resources via a network (cf. computing platform 202, processors 230, machine-readable instructions 206, remote platform 204, external resources 226, and network 150). In addition, the machine-readable instructions may be part of a generating module, admin precompile module(s), and a verifying module, as disclosed herein (cf. generating module 208, first precompile module 210, second precompile module 212, third precompile module 214, fourth precompile module 216, fifth precompile module 218, and/ or verifying module 220). Further for explanatory purposes, the steps of the example process 400 are described herein as occurring in serial, or linearly. However, multiple instances of the example process 400 may occur in parallel. Moreover, in embodiments consistent with the present disclosure, at least one or more steps in process 400 may be executed in a different order, simultaneously, quasi-simultaneously, or overlapping in time.

Step 402 includes receiving, from a client device, a call request calling an input address for executing a specified precompile at a blockchain initiated in a VM. In some implementations, the specified precompile may be an admin precompile or some other precompile available to the VM. In some implementations, the input address may correspond to a precompile. Alternatively, the input address may not match an address of a precompile of the VM.

Step 404 includes determining that the input address from the call request corresponds to an admin precompile. That is, determining that the input address matches an admin precompile address.

Step 406 includes verifying the client device (or user of the client device) is authorized. For example, identify if the client device is authorized to perform deployments (e.g., deploy a contract) in the VM. In some implementations, in order for a deployer (e.g., the client device) to interact with the VM or applications in the VM, the deployer must go through a KYC/KYB compliance process prior to having interaction(s). As such, anybody that is deploying applications or interacting with the VM can be considered an authorized user.

Step 408 includes identifying the respective operations of the admin precompile.

Step 410 includes enabling the admin precompile at the client device and executing the identified operations.

Although FIG. 4 shows example steps of the process 400, in some implementations, the process 400 may include additional steps, fewer steps, different steps, or differently arranged steps than those depicted in FIG. 4. In some embodiments, processes consistent with the present disclosure may include at least one or more steps as in process 400 performed simultaneously, quasi-simultaneously or overlapping in time. Additionally, or alternatively, two or more of the steps of the process may be performed in parallel.

Hardware Overview

Figure 5:
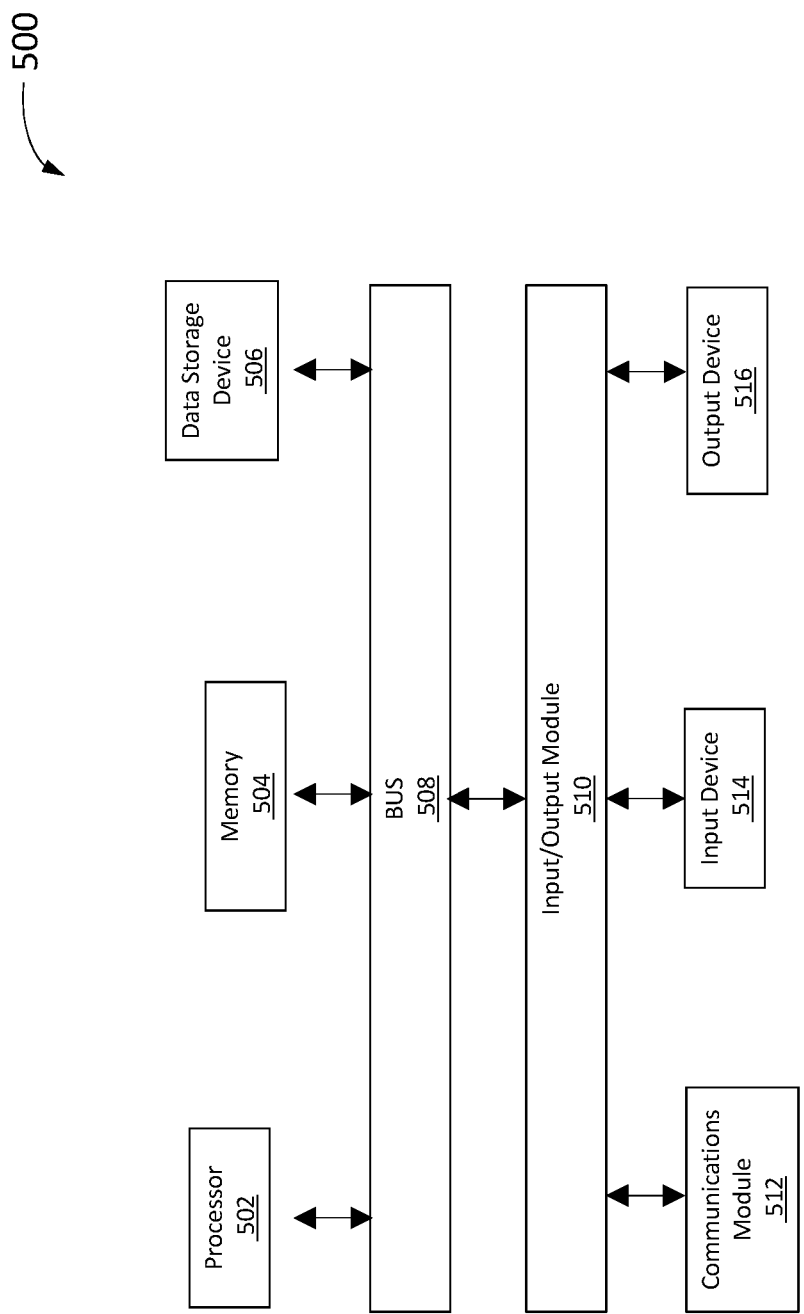
FIG. 5 is a block diagram illustrating an example computer system with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities. Computer system 500 may include a desktop computer, a laptop computer, a tablet, a phablet, a smartphone, a feature phone, a server computer, or otherwise. A server computer may be located remotely in a data center or be stored locally.

The computer system 500 (e.g., server and/or client) includes a bus 508 or other communication mechanism for communicating information, and a processor 502 coupled with the bus 508 for processing information. By way of example, the computer system 500 may be implemented with one or more processors 502. Each of the one or more processors 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by the processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 500 further includes a data storage device 506 such as a magnetic disk or optical disk, coupled to bus 508 for storing information and instructions. The computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described systems can be implemented using a computer system 500 in response to the processor 502 executing one or more sequences of one or more instructions contained in the memory 504. Such instructions may be read into memory 504 from another machine-readable medium, such as data storage device 506. Execution of the sequences of instructions contained in the main memory 504 causes the processor 502 to perform the process steps described herein. One or more processors in a multi-processing arrangement may also be employed to execute the sequences of instructions contained in the memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 500 can include clients and servers. A client and server are generally remote from each other and typically interact through a communication network. The relationship of client and server arises by virtue of computer programs running on the respective computers and having a client-server relationship to each other. The computer system 500 can be, for example, and without limitation, a desktop computer, laptop computer, or tablet computer. The computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 502 for execution. Such a medium may take many forms, including, but not limited to, non-volatile media, volatile media, and transmission media. Non-volatile media include, for example, optical or magnetic disks, such as the data storage device 506. Volatile media include dynamic memory, such as the memory 504. Transmission media include coaxial cables, copper wire, and fiber optics, including the wires that comprise the bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, performed by at least one processor, the method comprising:
    generating an institutional subnet with one or more blockchains;
    enabling a set of administrative precompiles for the one or more blockchains, the set of administrative precompiles including addresses approved to modify parameters of the one or more blockchains;
    modifying one or more of the set of administrative precompiles based on risk score requirements associated with at least one of the one or more blockchains, the risk score requirements including at least conditions for executing transactions on or between blockchains;
    verifying whether a user of the institutional subnet is authorized to interact with the one or more blockchains;
    tracking a risk score associated with the user, wherein the risk score is subject to change; and
    modifying, based on the risk score associated with the user, at least one administrative precompile in the set of administrative precompiles for the one or more blockchains.

2. The computer-implemented method of claim 1, further comprising:
    receiving a call request, from an authorized user, including an address of at least one administrative precompile in the set of administrative precompiles; and
    executing operations of the at least one administrative precompile based on the call request.

3. The computer-implemented method of claim 1, further comprising:
    authorizing users of the institutional subnet via a regulation process; and
    registering authorized users of the institutional subnet in the one or more blockchains, wherein registered users of the one or more blockchains are authorized to interact with the one or more blockchains.

4. The computer-implemented method of claim 1, wherein the set of administrative precompiles include parameters of a state machine managing the one or more blockchains.

5. The computer-implemented method of claim 1, wherein the set of administrative precompiles include parameters used to enforce security regulations of a compliance regulation process.

6. The computer-implemented method of claim 1, wherein the set of administrative precompiles are modified by administrative users, wherein the administrative users are defined in the set of administrative precompiles.

7. The computer-implemented method of claim 1, further comprising:
    deploying a non-transferable token application in the one or more blockchains; and
    generating a user portal, at the non-transferable token application, wherein a compliance regulation process is implemented to authorize users of the institutional subnet via the user portal.

8. The computer-implemented method of claim 1, wherein the set of administrative precompiles includes a transaction allow precompile maintaining a list of addresses allowed to perform transactions on the one or more blockchains.

9. The computer-implemented method of claim 1, wherein the set of administrative precompiles includes a contract deployer precompile maintaining a list of addresses allowed to deploy a contract on the one or more blockchains.

10. The computer-implemented method of claim 1, wherein the set of administrative precompiles includes a native minter precompile maintaining a list of addresses allowed to mint native tokens of the institutional subnet.

11. The computer-implemented method of claim 1, wherein the set of administrative precompiles includes a fee configuration precompile maintaining a list of addresses allowed to update fee configurations of the institutional subnet.

12. The computer-implemented method of claim 1, wherein the set of administrative precompiles includes a reward precompile maintaining a list of addresses allowed to update an award manager of the one or more blockchains.

13. A system for implementing administrative precompiles, comprising:
    one or more processors; and
    a memory storing instructions which, when executed by the one or more processors, cause the system to:
        generate an institutional subnet with one or more blockchains;
        enable a set of administrative precompiles for the one or more blockchains, the set of administrative precompiles including parameters used to enforce security regulations in the institutional subnet, the set of administrative precompiles including addresses approved to modify parameters of the one or more blockchains;

modify one or more of the set of administrative precompiles based on risk score requirements associated with at least one of the one or more blockchains, the risk score requirements including at least conditions for executing transactions on or between blockchains;

verify whether a user of the institutional subnet is authorized to interact with the one or more blockchains;

track a risk score associated with the user, wherein the risk score is subject to change; and modify, based on the risk score associated with the user, at least one administrative precompile in the set of administrative precompiles for the one or more blockchains.

14. The system of claim 13, wherein the set of administrative precompiles includes a transaction allow precompile maintaining a list of addresses allowed to perform transactions on the one or more blockchains.

15. The system of claim 13, wherein the set of administrative precompiles includes a contract deployer precompile maintaining a list of addresses allowed to deploy a contract on the one or more blockchains.

16. The system of claim 13, wherein the set of administrative precompiles includes a native minter precompile maintaining a list of addresses allowed to mint native tokens of the institutional subnet.

17. The system of claim 13, wherein the set of administrative precompiles includes a fee configuration precompile maintaining a list of addresses allowed to update fee configurations of the institutional subnet.

18. The system of claim 13, wherein the set of administrative precompiles includes a reward precompile maintaining a list of addresses allowed to update an award manager of the one or more blockchains.

19. The system of claim 13, wherein the one or more processors further execute instructions to:

authorize users of the institutional subnet via a regulation process; and register authorized users of the institutional subnet in the one or more blockchains, wherein registered users of the one or more blockchains are authorized to interact with the one or more blockchains.

20. A non-transitory computer-readable storage medium comprising instructions stored thereon, which when executed by one or more processors, cause the one or more processors to perform a method comprising:

generating an institutional subnet with one or more blockchains;

enabling a set of administrative precompiles for the one or more blockchains, the set of administrative precompiles including parameters used to enforce security regulations in the institutional subnet and addresses approved to modify the parameters of the one or more blockchains;

modifying one or more of the set of administrative precompiles based on risk score requirements associated with at least one of the one or more blockchains, the risk score requirements including at least conditions for executing transactions on or between blockchains;

verifying whether a user of the institutional subnet is authorized to interact with the one or more blockchains;

tracking a risk score associated with the user, wherein the risk score is subject to change; and modifying, based on the risk score associated with the user, at least one administrative precompile in the set of administrative precompiles for the one or more blockchains.

* * * * *